Feb. 20, 1962     F. S. ALCOTT     3,022,498
WARNING DEVICE
Filed May 31, 1957

INVENTOR:
FREDERICK S. ALCOTT

BY Davern, Titton, Fallon & Lungmus
ATTORNEYS.

United States Patent Office 3,022,498
Patented Feb. 20, 1962

3,022,498
WARNING DEVICE
Frederick Stanley Alcott, 5717 Dempster St.,
Morton Grove, Ill.
Filed May 31, 1957, Ser. No. 662,785
7 Claims. (Cl. 340—253)

This invention relates to a warning device, and more particularly to a device adapted to warn of the interruption of flow of electrical current.

The device of this invention has utility in connection with electrical appliances wherein it is important for a signal to be conveyed when the power supply to the appliance is interrupted. In many instances, it is not only desirable for a signal to be given when the power fails, but also when the power resumes. Applications for such a signalling device can be found in many phases of activity, including both domestic and industrial appliances. It is to be appreciated, however, that devices embodying teachings of my invention may also find use wherever any condition such as pressure or vacuum, liquid level, or the like, can be translated into an electrical condition.

In the past, devices have been provided for indicating either the failure or resumption of electrical current. Generally, these devices have employed moving parts of a mechanical nature that tend to cause the devices themselves to become inoperative after a time, and frequently at precisely the time when their operation is required.

It is a general object of this invention to provide a warning device that overcomes the disadvantages and problems set forth above. Another object is to provide a warning device that will give a warning in the event of power failure. Still another object is to provide a device that is adapted to give an audible signal in the event of both power failure and power resumption. Yet another object is to provide a warning device capable of signalling failure and resumption of electrical power that is characterized by the absence of mechanical parts usually found to contribute to breakdown of the device itself. Other objects and advantages of this invention can be seen as this specification proceeds.

This invention will be explained in an illustrative embodiment in conjunction with an accompanying drawing, in which—

Figure 1:
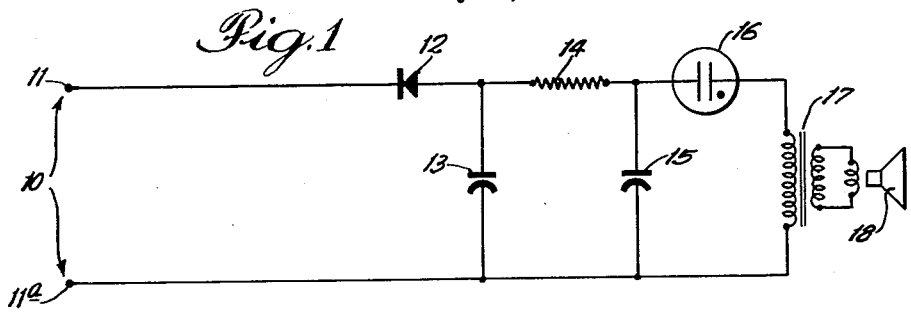
Figure 2:
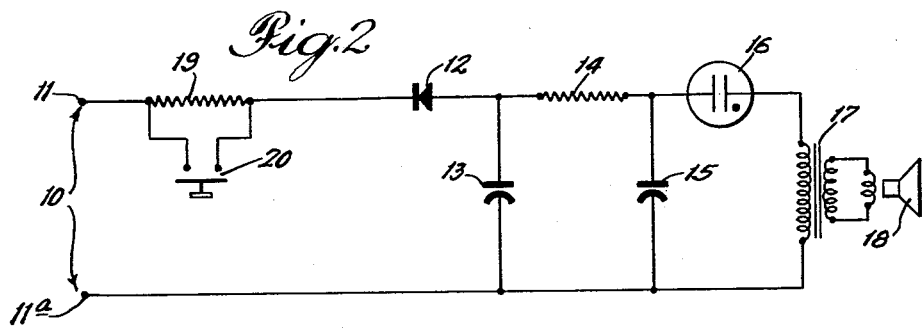
Figure 3:
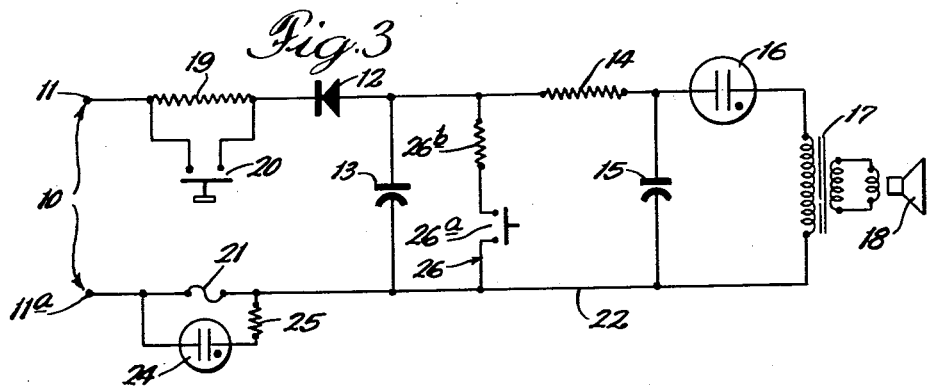
Figure 4:
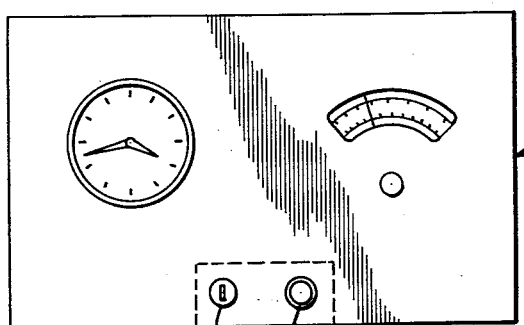

FIGURE 1 is a schematic view of a wiring diagram embodying teachings of this invention; FIG. 2 is a veiw similar to FIG. 1 but showing a modified electrical circuit; FIG. 3 is a view similar to FIGS. 1 and 2 but showing still another modification; and FIG. 4 is an elevational view of a clock radio which incorporates a circuit constructed in accordance with teachings of this invention.

In the illustration given, the numeral 10 indicates a potential applied across a pair of contacts 11 and 11a. Where the warning device is employed in conjunction with an electrical appliance, potential 10 can conveniently take the form of 110 volts A.C.

In FIG. 1, the numeral 12 indicates a half wave rectifier electrically connected to one of contacts 11 and 11a, connected to rectifier 12 remote from contact 11, and also connected to contact 11a is capacitor 13. In parallel with capacitor 15 is gas diode 16 and step-down transformer 17. Connected to the secondary or low voltage winding of transformer 17 is audio speaker 18. Suitable other warning devices can be employed in place of audio speaker 18.

Alternately, the disposition of capacitors 13 and 15 and resistance 14 can be considered to be a pi arrangement, with the capacitors providing the legs thereof. Thus, capacitor 13 is disposed across the applied potential 10 (except for the low voltage drop occurring across rectifier 12). So also can gas diode 16 and transformer 17 be considered to have a parallel relationship with the leg of the pi arrangement remote from voltage source 10.

FIG. 2 includes the same elements as are found in FIG. 1 but in addition includes resistor 19 interconnected between contact 11 and rectifier 12. A by-pass around resistance 19 is provided in the form of momentary pushbutton 20. Pushbutton 20 is provided in a normally open condition.

FIG. 3 embodies a circuit essentially similar to that found in FIGS. 1 and 2 and in addition includes a fuse 21 interconnected between contact 11a and the common line 22 connecting capacitors 13 and 15 and transformer 17.

Exemplary of the use of circuits as illustrated above is the clock radio shown in FIG. 4 and designated generally by the numeral 23. The front panel of clock radio 23 includes a pushbutton 20 and a glow tube which can be gas diode 16 of the preceding figures. Many persons employ clock radios to insure their awakening at a predetermined time. This may be necessary for their going to work, making a train or plane connection, or some other situation where time is of the essence. In such a case, the reliance of the person on the awakening device, that is, the clock radio, would be frustrated if the electrical power supply to the clock radio failed. Even if the power were subsequently resumed, there would be a loss of time in operation of the clock which would result in a belated awakening. Through the interposition of a device embodying teachings of my invention, this undesirable situation can be avoided. In the exemplary situation hereinabove referred to, a device constructed according to my invention would give an audible alarm at the time of power failure. Still further, the device will give a second audible alarm at the time of power resumption.

It is believed that a brief explanation of the operation of the device in each of these situations will aid in the understanding of this invention.

Operation

Prior to the application of potential across contacts 11 and 11a, the circuit and its components are completely deenergized, that is, there is no electrical potential existing across any of the circuit components. Upon the application of, say, 110 volts alternating current across contacts 11 and 11a, current begins to flow through half wave rectifier 12. Upon voltage reversal, no reverse current flows because of the rectifying characteristic of rectifier 12. Conveniently, rectifier 12 can take the form of a 20 milliampere selenium rectifier. Other rectifying devices can be conveniently employed, but excellent results can be obtained with a selenium rectifier, which has the advantage of being of low cost.

Unidirectional current flowing through rectifier 12 then is distributed between capacitor 13 and resistance 14. The flow of unidirectional current in capacitor 13 charges it after a suitable time, depending upon the rating of capacitor 13 to the maximum voltage available on the side of rectifier 12 remote from contact 11. Current flowing through resistance 14 charges capacitor 15, flow of current from resistor 14 being restricted from flowing through diode 16 and transformer 17 for the time being. Where diode 16 has a firing potential of about 65 volts, it is first necessary that capacitor 15 have that potential existing across it before firing of gas diode 16 can occur. Meanwhile, when 110 volts A.C. is applied across contacts 11 and 11a, capacitor 13 receives a charge across it of about 140 to 150 volts, corresponding to the $E_{max}$. of 110 volts R.M.S.

When the potential across capacitor 15 exceeds the firing potential of gas diode 16, gas diode 16 begins to conduct a current governed essentially by the resistance characteristic of resistance 14. Excellent results have been obtained where resistance 14 has a rating of from about 700,000 to 800,000 ohms with a power capacity of ½ watt. Under these conditions, a constant current of about 0.018 milliampere will flow through resistance 14, diode 16, and transformer 17. Under these conditions, diode 16 will glow, giving an indication that power is on and that the warning circuit is operative. However, no audible signal will be heard, since a continuous and constant current is flowing through transformer 17.

Upon interruption of potential 10, current flow through rectifier 12 stops. Capacitor 15 discharges through diode 16 and transformer 17 until the potential across capacitor 15 falls below the firing potential of diode 16. Thereafter, capacitor 15 is recharged to the firing potential of diode 16 by current flowing from capacitor 13 through resistance 14. It is to be appreciated that because of the high resistance of resistance 14, the build-up of current flowing from capacitor 13 is rather slow, the build-up being governed by the R.C. characteristic. Thereafter, current from capacitor 15 again flows through diode 16 until the potential across capacitor 15 falls below the firing potential of diode 16. The intermittent flow of current through diode 16 and, therefore, transformer 17, creates an audible sound in speaker 18 which persists until all the potential across capacitor 13 falls below the firing potential of diode 16. Excellent results have been obtained when gas diode 16 is provided in the form of a neon glow tube such as a N.E. 45, which in turn is coupled to an output transformer having a 200 ohm primary winding and a 3.2 secondary winding. Speaker 18 can conveniently be a two-inch permanent magnet speaker. Capacitors 13 and 15 may each have a voltage rating of 150, capacitor 13 being a 100 microfarad capacitor, while capacitor 15 has a rating of 0.01 microfarad. With such circuit elements, the duration of the warning signal is in excess of two minutes following a brief time delay of less than ten seconds in order to achieve firing of diode 16.

Enlarging the ratings of the various components in the signalling circuit provides a louder tone, of longer duration. This can be specifically achieved by enlarging the storage capacitor 13. Varying the rating of the cyclic discharge capacitor 15 affects the tone, volume and duration of the alarm given by speaker 18. Making capacitor 15 smaller increases the frequency of the alarm and permits the alarm to be heard for a longer time, but at lower volume.

When it is desired to provide an alarm upon resumption of current, the modified circuit shown in FIGS. 2 and 3 can be employed. There, a momentary pushbutton of a normally open character is provided as a by-pass or shunt around resistor 19, which is in series with contact 11 and rectifier 12. Resistor 19 acts as a limiting resistor for the build-up of potential in capacitor 13 and can conveniently have a 6,000 ohm rating at ½ watt. It is to be noted that resistor 19 may be varied according to the value of input voltage 10. Without pushbutton 20, it would be impossible to fully charge capacitor 13 to the $E_{max}$ of potential 10.

When a potential, say, 110 volts A.C., is applied across contacts 11 and 11a of the circuits shown in FIGS. 2 and 3, capacitor 13 is charged to a potential of about 100 volts, or slightly above the firing potential of diode 16. Concurrently, capacitor 15 is correspondingly charged. However, with the firing of diode 16, capacitor 15 is discharged much more quickly than it can be recharged from capacitor 13 or the small current flowing through resistor 19 under the influence of the power supply. Thus, capacitor 15 drops below the firing potential of diode 16. Thereafter, the potential across capacitor 15 is increased until diode 16 again fires. The intermitent current provided by the cyclic charging of capacitor 15 provides an audible tone in speaker 18. Momentary depression of pushbutton 20 permits the flow of larger current through rectifier 12 and the building up of the potential across capacitor 13 of $E_{max}$. The corresponding potential impressed across capacitor 15 is then well in excess of the firing potential of diode 16 so that it now continuously conducts current and no sound is created in speaker 18.

The circuit shown in FIG. 3 includes a fuse 21 not found in the circuit shown in FIG. 2. In parallel with fuse 21 is a gas diode or glow tube 24. Only when fuse 21 fails will tube 24 glow, since the voltage required for glowing is impossible to be applied to the fuse 21 without causing the same to fail. Thus, a device embodying the circuit of FIG. 3 would indicate to a viewer various conditions of the operating circuit depending upon the condition of tubes 16 and 24. When tube 16 is on and tube 24 is off, the circuit is operating properly. With tube 16 on and tube 24 also on, the viewer immediately perceives that fuse 21 has failed. With tube 16 off and tube 24 on, there is an indication of an inoperative circuit. With both tubes off, the viewer then understands that there is no power applied to the circuit. Also seen in FIG. 3 is diode load resistor 25, which is placed in series with diode 24.

Thus it can be seen that diode 16 not only acts as an electronic valve for the cyclic discharge of capacitor 15, but also acts as an indicator of the condition of the power supply. Diode 16 also can be likened to an oscillator, since the intermittent current it produces is responsible for the provision of the audible tone from speaker 18.

Also shown in FIG. 3 is the provision of means for silencing the device before the alarm signal has ceased. This means is designated generally by the numeral 26 and includes a pushbutton 26a and a resistor 26b shunted across capacitor 13. Conveniently, pushbutton 26a can be the same type as pushbutton 20. When pushbutton 26a is depressed, the voltage existing across capacitor 13 is shunted through means 26 and thus silences the signal.

While, in the foregoing specification, I have set forth specific structures in considerable detail for the purpose of illustrating embodiments of the invention, it will be understood that such details may be varied widely by those skilled in the art without departing from the spirit of my invention.

I claim:

1. In a device for providing an audible warning in the event of failure of electrical power, first potential storage means, resistance means and second potential storage means serially connected and connected in parallel with said first potential storage means, means for applying rectified alternating current electrical potential across said first potential storage means, said applying means constituting the only electrical potential connected to said device, and electronic valve means connected in parallel with said second potential storage means, said valve means being adapted to pass current from said potential storage means only above a predetermined potential, and when said applying means fails, to develop a cyclic current from said potential storage means free of any potential source external to said device.

2. The structure of claim 1, in which said valve means is a gas diode.

3. In a device for providing an audible warning in the event of power failure, first potential storage means, means for applying rectified alternating current electric potential across said first potential storage means, said applying means constituting the only electrical potential connected to said device, a circuit in parallel with said first potential storage means comprising resistance means and first and second subcircuit means, said resistance means being in series with each of said subcircuit means, said subcircuit means being connected in parallel with each other, said first subcircuit means comprising second potential storage means and said second subcircuit means comprising gas diode means and speaker means in series, said gas diode means and said potential storage means cooperating upon failure of said applying means to generate a cyclic current effective to energize said speaker means free of any E.M.F. source external to said device.

4. The structure of claim 3, in which said first potential storage means has greater capacity than said second potential storage means.

5. In a device for providing an audible warning in the event of failure of electrical power, first and second capacitor means and resistance means connected in pi arrangement with the capacitor means providing the legs of said pi arrangement, power source means electrically connected to one leg of said pi arrangement, said power source constituting the only E.M.F. source connected to said device, said power source having an alternating characteristic and a rectifier being interposed between said source and said pi arrangement, and, in parallel with the other leg of said pi arrangement, a circuit comprising gas diode means and speaker means in series, said gas diode means and said capacitor means cooperating upon failure of said power source to generate a cyclic current effective to energize said speaker means free of any E.M.F. source external to said device.

6. In a device for providing an audible warning in the event of both power failure and power resumption, shuntable resistance means and capacitor means in series therewith connected across a source of power, said source constituting the only source of E.M.F. connected to said device, said power source being of an alternating characteristic and a rectifier being connected in series with said shuntable resistance means, series-connected second resistance means and second capacitor means connected in parallel with the first-mentioned capacitor means, and series-connected electron valve means and speaker means connected in parallel with the said second capacitor means, said valve means and said capacitor means cooperating upon power failure to generate a cyclic current.

7. The structure of claim 6, in which the said second capacitor means is of a lower capacity than the said first-mentioned capacitor means.

References Cited in the file of this patent

UNITED STATES PATENTS

| | | |
|---|---|---|
| 2,235,667 | Blount et al. | Mar. 18, 1941 |
| 2,275,930 | Torcheux | Mar. 10, 1942 |
| 2,365,566 | Langer | Dec. 19, 1944 |
| 2,576,585 | Fleming | Nov. 27, 1951 |
| 2,776,420 | Woll | Jan. 1, 1957 |